United States Patent
Cavichioli Gonzaga et al.

(10) Patent No.: US 12,534,166 B2
(45) Date of Patent: Jan. 27, 2026

(54) METHOD AND DEVICE OF CONTROLLING AN OPERATION OF A FLOATING WIND TURBINE

(71) Applicant: Siemens Gamesa Renewable Energy A/S, Brande (DK)

(72) Inventors: Carlos Alberto Cavichioli Gonzaga, Vejle (DK); Henrik Steffensen, Århus (DK); Kasper Laugesen, Esbjerg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/282,460

(22) PCT Filed: Mar. 7, 2022

(86) PCT No.: PCT/EP2022/055720
§ 371 (c)(1),
(2) Date: Sep. 15, 2023

(87) PCT Pub. No.: WO2022/200025
PCT Pub. Date: Sep. 29, 2022

(65) Prior Publication Data
US 2024/0140571 A1  May 2, 2024

(30) Foreign Application Priority Data
Mar. 22, 2021 (EP) .................................... 21163874

(51) Int. Cl.
*B63B 79/10* (2020.01)
*B63B 35/44* (2006.01)
(Continued)

(52) U.S. Cl.
CPC .............. *B63B 79/10* (2020.01); *B63B 39/14* (2013.01); *F03D 7/0204* (2013.01);
(Continued)

(58) Field of Classification Search
CPC ... B63B 79/10; B63B 39/14; B63B 2035/446; B63B 39/00; F03D 7/0204; F03D 7/0224;
(Continued)

(56) References Cited

U.S. PATENT DOCUMENTS

2008/0260514 A1* 10/2008 Nielsen .................. F03D 13/25
425/130
2011/0316277 A1* 12/2011 Skaare .................. F03D 7/0296
290/44
(Continued)

FOREIGN PATENT DOCUMENTS

EP  2370694 B1  4/2015
EP  1952017 B1  12/2015
(Continued)

OTHER PUBLICATIONS

Inoue Shunji et al (WO 2013065323)—Machine Translation (Year: 2013).*

(Continued)

*Primary Examiner* — Brian Christopher Delrue
(74) *Attorney, Agent, or Firm* — Schmeiser, Olsen & Watts LLP

(57) ABSTRACT

A method of controlling an operation of a floating wind turbine which performs a yaw rotation, a roll rotation and a pitch rotation, which controls a parameter of the operation of the wind turbine by determining a pitch rotation; determining a roll rotation; calculating a pitch difference between the determined pitch rotation and a wind turbine pitch reference; calculating a roll difference between the determined roll rotation and a wind turbine roll reference; determining a pitch and roll impact value based on the pitch difference and the roll difference; determining a reference of the parameter based on a predefined reference of the parameter and the (Continued)

pitch and roll impact value; and controlling the parameter of the wind turbine based on the reference of the parameter.

19 Claims, 4 Drawing Sheets

(51) Int. Cl.
  *B63B 39/14* (2006.01)
  *F03D 7/02* (2006.01)
(52) U.S. Cl.
  CPC ......... *F03D 7/0224* (2013.01); *F03D 7/0276* (2013.01); *F03D 7/028* (2013.01); *B63B 2035/446* (2013.01); *F05B 2240/93* (2013.01); *F05B 2270/328* (2013.01); *F05B 2270/80* (2013.01)
(58) Field of Classification Search
  CPC ...... F03D 7/0276; F03D 7/028; F03D 7/0296; F03D 7/0202; F05B 2240/93; F05B 2270/328; F05B 2270/80; F05B 2240/932; F05B 2240/95; F05B 2240/97; Y02E 10/72; Y02E 10/727
  See application file for complete search history.

(56) References Cited

U.S. PATENT DOCUMENTS

| 2014/0339828 | A1* | 11/2014 | Peiffer | B63B 43/06 |
| | | | | 290/44 |
| 2016/0123302 | A1* | 5/2016 | Couchman | F03D 17/00 |
| | | | | 416/43 |
| 2024/0140571 | A1* | 5/2024 | Cavichioli Gonzaga | |
| | | | | B63B 79/10 |

FOREIGN PATENT DOCUMENTS

| EP | 3004636 B1 | 1/2017 |
| WO | 2013065323 A1 | 5/2013 |

OTHER PUBLICATIONS

PCT International Search Report and Written Opinion of International Searching Authority mailed May 20, 2022 corresponding to PCT International Application No. PCT/EP2022/055720 filed Mar. 7, 2022.

* cited by examiner

METHOD AND DEVICE OF CONTROLLING AN OPERATION OF A FLOATING WIND TURBINE

CROSS-REFERENCE TO RELATED APPLICATIONS

This application claims priority to PCT Application No. PCT/EP2022/055720, having a filing date of Mar. 7, 2022, which claims priority to EP Application No. 21163874.7, having a filing date of Mar. 22, 2021, the entire contents both of which are hereby incorporated by reference.

FIELD OF TECHNOLOGY

The following relates to a method and a device of controlling an operation of a floating wind turbine to control or protect rotation conditions referring to speed, acceleration or amplitude of roll and pitch motions of the floating wind turbine.

BACKGROUND

Floating wind turbines (FWTs) are known to be subjected to additional motions due the additional degrees of freedom (DOF) compared to conventional bottom fixed turbines. For instance, FWTs experiences floater pitch rotational motion which might be amplified due to the coupling with a standard rotor speed control through blade pitch angle actuation. Therefore, high rotor speed arises, high blade pitch actuation as well as excessive tower bottom/floater loads, which are seen increasing the material costs involved in tower/foundation design.

Thus, the aim of maximizing controller performance and minimizing the floater pitch motion is a challenge of great interest that has drawn attention in both industrial and academic communities.

Floater pitch motion further introduces challenges in existing estimates, such as determining the rotational speed from hub accelerations and other components in the tower acceleration. For instance, the heave motion might interfere with the accelerometer and gyroscopes creating wrong estimates used in the controller. Moreover, other floater structural modes such as the roll motion may be excited during the turbine operation. The controller should also be able to cope with any floater natural motion that is undesirably amplified.

The floater pitch motion instability has previously been solved by adding an additional reference speed signal to the speed-pitch control in such a way that the controller reference does not interfere with the floating system. The input comes from a gyroscope measuring the tilt angle/angular velocity and/or an accelerometer measuring the tower and/or nacelle accelerations. Also, other solutions have been made to detune the speed pitch controller to lower the bandwidth (frequency), such that it will not react on the floater pitch frequency. However, this comes with poor rotational speed tracking capabilities. Detuning is trade-off between stability and control performance. Nonetheless, small focus has been given to include the floater roll natural mode damping.

A rotor speed variation caused by the aerodynamic torque changes due to the floater pitch motion is still a problem and thus speed regulation is still necessary.

SUMMARY

An aspect relates to provide an improved method and an improved device of controlling an operation of a floating wind turbine.

According to a first aspect of embodiments of the invention, a method of controlling an operation of a floating wind turbine is provided. The floating wind turbine comprises a tower, a nacelle, which is mounted to the tower rotatable about a nacelle yaw axis, a hub, which is mounted to the nacelle rotatable about a hub rotational axis, and blades being mounted to the hub.

The wind turbine is floated such that the wind turbine can perform a wind turbine yaw rotation about a wind turbine yaw axis essentially parallel to the nacelle yaw axis, a wind turbine roll rotation about a wind turbine roll axis essentially perpendicular to the wind turbine yaw axis and essentially parallel to the hub rotational axis, and a wind turbine pitch rotation about a wind turbine pitch axis essentially perpendicular to the wind turbine roll axis and the wind turbine yaw axis.

The method controls at least one parameter of the operation of the floating wind turbine by the following steps: determining a pitch rotation of the wind turbine; determining a roll rotation of the wind turbine; calculating a pitch difference between the determined pitch rotation and a wind turbine pitch reference; calculating a roll difference between the determined roll rotation and a wind turbine roll reference; determining a pitch and roll impact value based on the pitch difference and the roll difference; determining a reference of the parameter based on a predefined reference of the parameter and the pitch and roll impact value; and controlling the parameter of the wind turbine based on the reference of the parameter. The at least one parameter can be any parameter which is used in operating the floating wind turbine.

Instead of modifying blade pitch angles through a conventional speed-pitch controller to keep the rotor speed close to its reference, embodiments of the present invention proposes improved control handles. Advantageously, rotation conditions referring to speed, acceleration or amplitude of roll and pitch motions of the floating wind turbine can be controlled or protected.

In an embodiment, the reference of the parameter is a target output power of the wind turbine. In an embodiment, the output power of the wind turbine is controlled based on the target output power for a speed regulation which minimizes blade pitch angle variations and/or aerodynamic damping variations; and/or the output power of the wind turbine is controlled based on the target output power for generating a counter torque to damp the wind turbine roll rotation.

In an embodiment, the reference of the parameter is a target position of an add-on member on at least one of the blades, which add-on member changes an aerodynamic property of the blade. In an embodiment, the position of add-on members on the blade is controlled based on the target position of add-on members on the blades to implement a positive damping into the wind turbine for cancelling a negative damping from a speed-pitch controller and thereby damping wind turbine pitch rotation; and/or the position of add-on members on the blade is controlled based on the target position of add-on members on the blades individually for each blade to implement a counter-torque for damping the wind turbine roll rotation.

In an embodiment, the reference of the parameter is a target rotational speed of the hub or a blade pitch angle of the blades.

In an embodiment, the pitch rotation of the wind turbine is determined based on a tower top acceleration which is measured by a G-sensor; the roll rotation of the wind turbine is determined based on the tower top acceleration which is measured by the G-sensor; the pitch rotation and/or the roll rotation is determined from an acceleration in pitch and/or roll coordinates which are measured by a G-sensor; the pitch rotation and/or the roll rotation is determined from a velocity in the pitch and/or roll coordinates which are measured by a gyroscope; the pitch rotation and/or the roll rotation is determined from angles in the pitch and/or roll coordinates which are measured by an inclinometer; and/or the pitch rotation and/or the roll rotation is determined from a load on the blade measured by a blade load sensor which measures a load on at least one of the blades, for example with suitable coordinate transformation and angle of attack.

In an embodiment, the method further includes at least one of the following steps: estimating a natural frequency of the wind turbine roll rotation and/or the wind turbine pitch rotation; a filtering step to provide a signal-to-noise ratio between a frequency of the wind turbine roll rotation and/or the wind turbine pitch rotation on the one hand, and a frequency of an input sensor signal on the other hand; a parametrical updating step to verify that the filtering step is targeting an expected frequency.

In an embodiment, the pitch and roll impact value is determined from a lookup-table where values of the pitch difference and the roll difference are stored as arguments.

In an embodiment, the reference of the parameter is determined from a lookup-table where values of the pre-defined reference and the pitch and roll impact value are stored as arguments.

In an embodiment, the parameter of the wind turbine is controlled for controlling at least one of a speed, an acceleration, and an amplitude of roll and/or pitch motions of the floating wind turbine.

According to a second aspect of embodiments of the invention, a control device for controlling an operation of a floating wind turbine is provided. The floating wind turbine comprises a tower; a nacelle, which is mounted to the tower rotatable about a nacelle yaw axis and comprises a hub, which is mounted to the nacelle rotatable about a hub rotational axis; and blades being mounted to the hub. The wind turbine is floated such that the wind turbine can perform a wind turbine yaw rotation about a wind turbine yaw axis in parallel to the nacelle yaw axis, a wind turbine roll rotation about a wind turbine roll axis perpendicular to the wind turbine yaw axis and in parallel to the hub rotational axis, and a wind turbine pitch rotation about a wind turbine pitch axis perpendicular to the wind turbine roll axis and the wind turbine yaw axis. The control device is configured to control at least one parameter of the operation of the floating wind turbine by determining a pitch rotation of the wind turbine; determining a roll rotation of the wind turbine; calculating a pitch difference between the determined pitch rotation and a wind turbine pitch reference; calculating a roll difference between the determined roll rotation and a wind turbine roll reference; determining a pitch and roll impact value based on the pitch difference and the roll difference; determining a reference of the parameter based on a predefined reference of the parameter and the pitch and roll impact value; and controlling the parameter of the wind turbine based on the reference of the parameter.

Instead of modifying blade pitch angles through a conventional speed-pitch controller to keep the rotor speed close to its reference, embodiments of the present invention uses a so-called Unified-Motion-Control (UMC) based on the pitch and roll impact value to achieve the goal.

The controller can therefore minimize aerodynamic damping variations over the rotor and damp the floater motion in the roll direction. It is noteworthy that the UMC controller can obtain the necessary control action (concerning the output power or the operation of active add-on members on the blades) based on two error signals characterizing a multivariable control strategy.

Advantageously, embodiments of the present invention can minimize the floater motion instability by the UMC control which covers both roll and pitch directions together.

In addition, tower and floater involved costs in design, manufacturing, etc. can be reduced because of driving down the involved mechanical fatigue loads of those components. Also, embodiments of the present invention leverages an extended blade bearing life compared with the prior art, since its main control input can be a generator torque alleviating the blade pitch angle actuation.

Also an electrical torque as manipulated variable (instead of the blade pitch angle) can be used in order to eliminate a coupling between the floater pitch motion and the rotor speed as well as reducing the floater roll motion that is directly related to the side-side tower top motion.

According to a further aspect of embodiments of the invention, a floating wind turbine having a control device for controlling an operation of a floating wind turbine according to any of the preceding embodiments is provided.

BRIEF DESCRIPTION

Some of the embodiments will be described in detail, with reference to the following figures, wherein like designations denote like members, wherein.

DETAILED DESCRIPTION

Figure 1:
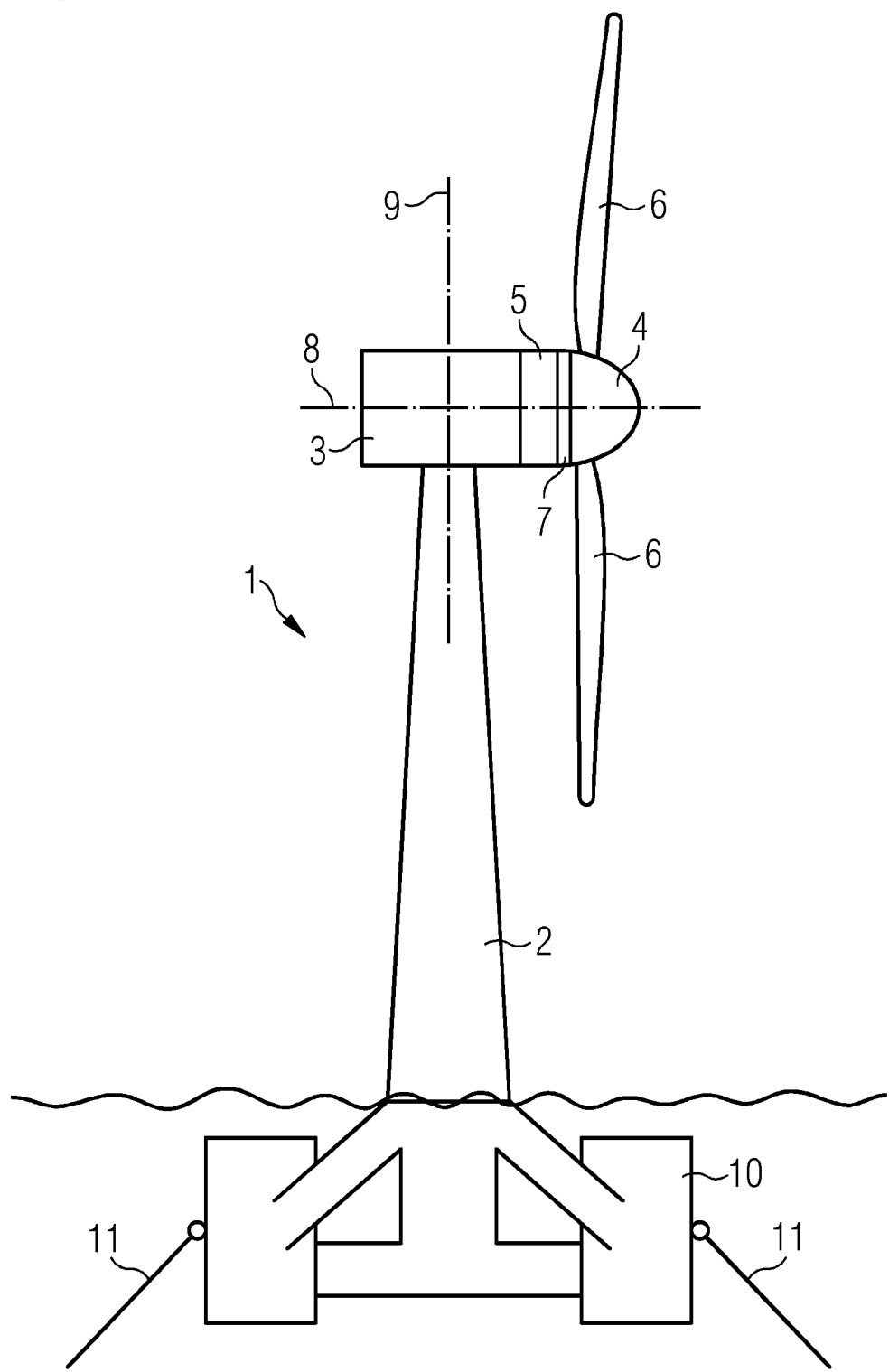
FIG. 1 shows a wind turbine and the different elements thereof.

The illustrations in the drawings are schematically. It is noted that in different figures, similar or identical elements are provided with the same reference signs.

FIG. 1 shows a wind turbine 1. The wind turbine 1 comprises a nacelle 3 and a tower 2. The nacelle 3 is mounted at the top of the tower 2. The nacelle 3 is mounted rotatable with regard to the tower 2 by means of a yaw bearing. The axis of rotation of the nacelle 3 with regard to the tower 2 is referred to as the nacelle yaw axis 9.

The wind turbine 1 also comprises a hub 4 with three rotor blades 6 (of which two rotor blades 6 are depicted in FIG. 1). The hub 4 is mounted rotatable with regard to the nacelle 3 by means of a main bearing 7. The hub 4 is mounted rotatable about a rotor axis of rotation 8.

The wind turbine 1 furthermore comprises a generator 5. The generator 5 in turn comprises a rotor connecting the generator 5 with the hub 4. If the hub 4 is connected directly to the generator 5, the wind turbine 1 is referred to as a gearless, direct-driven wind turbine. Such a generator 5 is referred as direct drive generator 5. As an alternative, the hub 4 may also be connected to the generator 5 via a gear box. This type of wind turbine 1 is referred to as a geared wind turbine. Embodiments of the present invention are suitable for both types of wind turbines 1.

The generator 5 is accommodated within the nacelle 3. The generator 5 is arranged and prepared for converting the rotational energy from the hub 4 into electrical energy in the shape of an AC power.

The floating wind turbine 1 comprises a floating foundation 10 which floats on the water surface. The floating foundation 10 is fixed to the sea ground by means of ropes 11. In an embodiment, the length of the ropes 11 can be variably controlled to stabilize the floating wind turbine 1 at high wind speeds or high waves.

Figure 2:
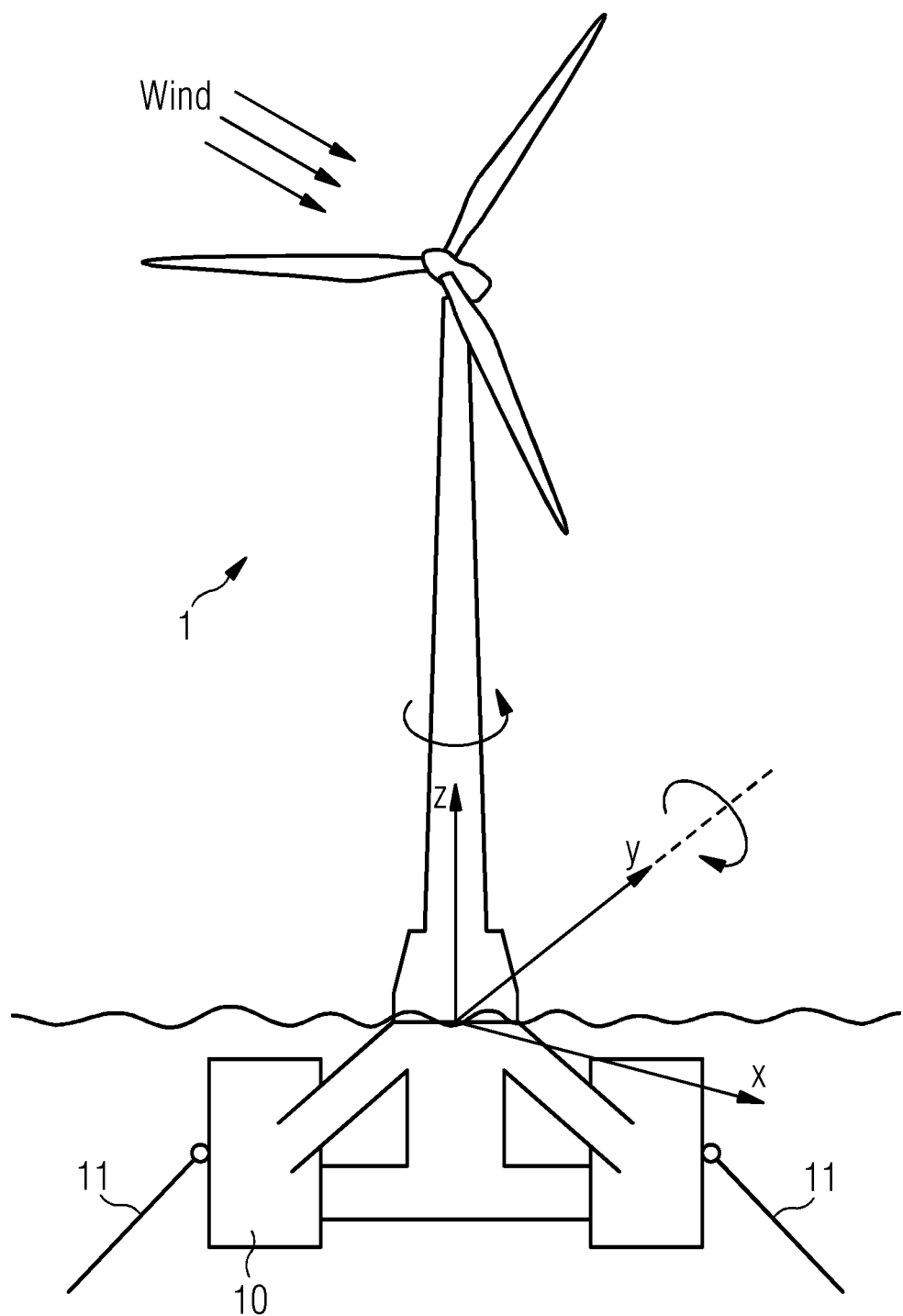
FIG. 2 shows lateral movements of the floating wind turbine.
Figure 3:
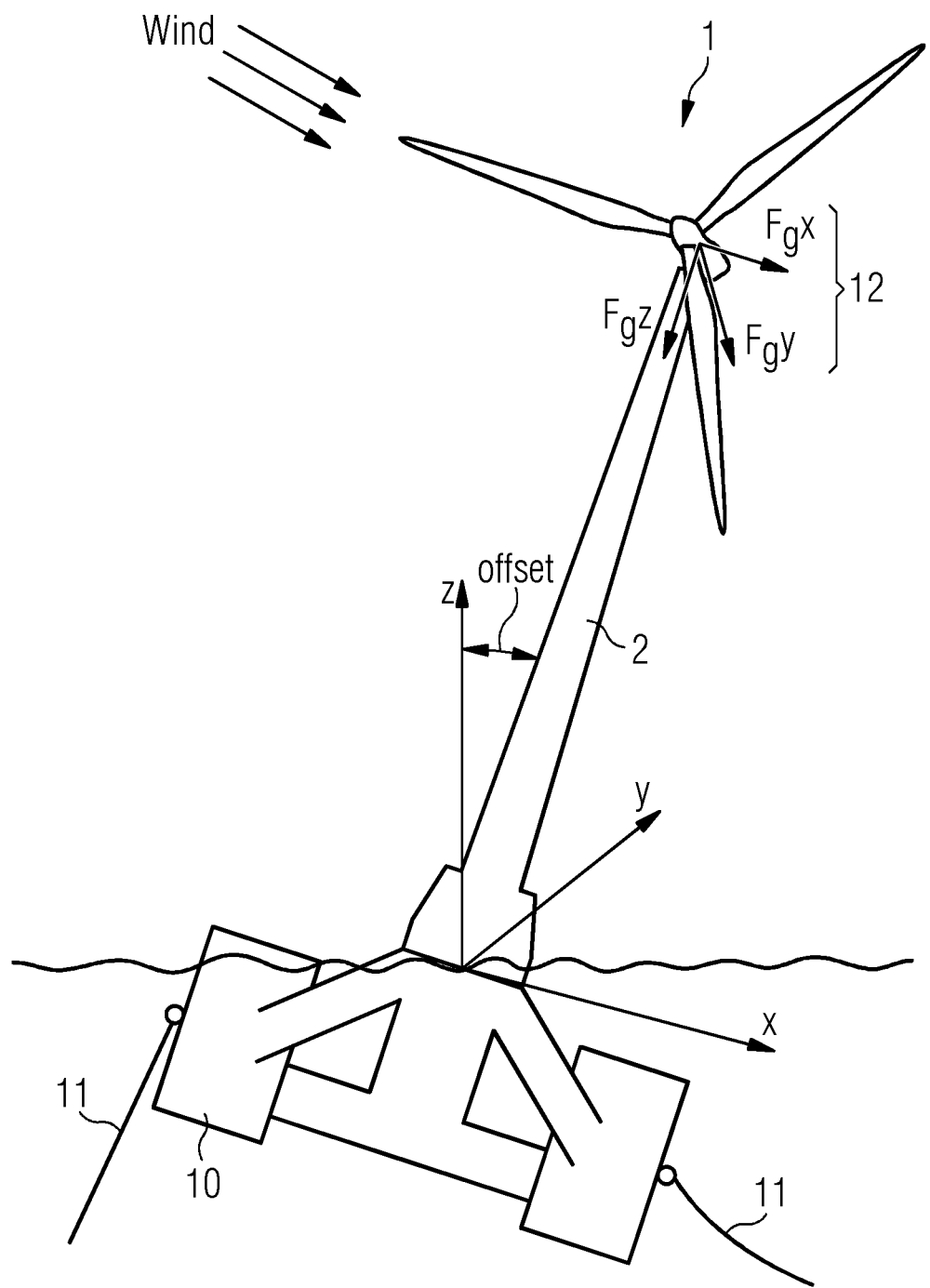
FIG. 3 shows rotational movements of the floating wind turbine.

FIG. 2 shows lateral movements of the floating wind turbine 1, and FIG. 3 shows rotational movements of the floating wind turbine 1. The floating wind turbine 1 is a complex system with multiple variables and multiple degrees of freedom (DOFs). Wind, wave and current loadings, which all are irregular by nature along with aerodynamical, structural and hydrodynamical couplings, as well as control actuations, all contribute to a highly complex dynamical behavior.

In a global coordinate system having the axes x, y and z, the floater motion can be divided into six individual DOF namely three translations: surge along the x-axis, sway along the y-axis and heave along the y-axis, and three rotations, i.e., floater roll about the x-axis, floater pitch about the y-axis and floater yaw about the z-axis. Due to the similarities in the naming between the pitch of the blades 6 and the pitch of the wind turbine 1, a clear distinction is made by dividing it into wind turbine pitch and blade pitch. That is, the wind turbine pitch is the rotation of the floating wind turbine 1 around its point of rotation, while blade pitch defines the controlled pitching of the blades 6. Likewise, wind turbine yaw defines the rotation of the wind turbine 1 around its vertical axis z, while rotor yaw is the rotation of the rotor-nacelle-assembly (RNA) around the nacelle yaw axis 9.

In general terms, the wind turbine 1 is floated such that the wind turbine 1 can perform a wind turbine yaw rotation about the wind turbine yaw axis z in parallel to the nacelle yaw axis 9, a wind turbine roll rotation about the wind turbine roll axis x perpendicular to the wind turbine yaw axis z and in parallel to the hub rotational axis 8, and a wind turbine pitch rotation about the wind turbine pitch axis y perpendicular to the wind turbine roll axis x and the wind turbine yaw axis z.

Figure 4:
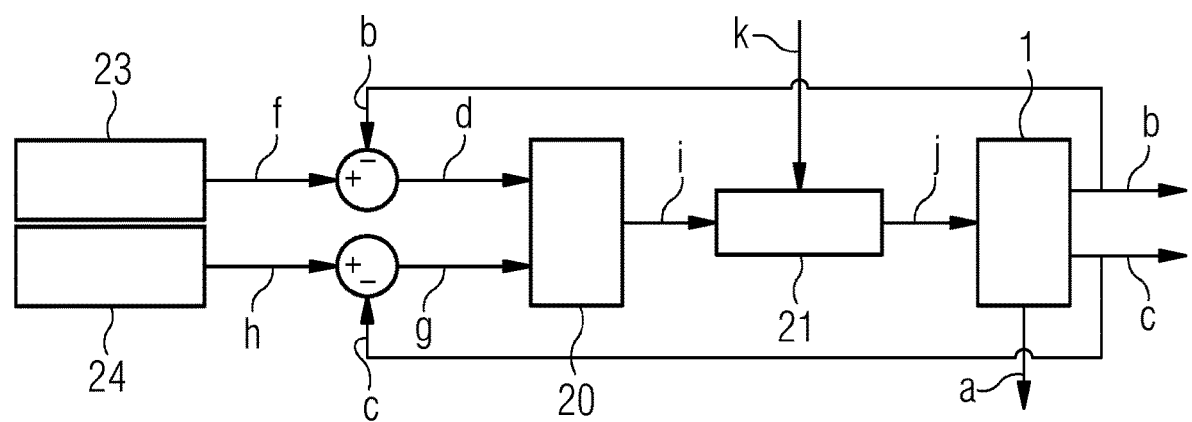
FIG. 4 shows a block diagram for controlling an operation of the wind turbine.

FIG. 4 shows a block diagram for controlling an operation of the wind turbine 1. The wind turbine 1 comprises a control device (not shown) which controls a parameter a of the operation of the floating wind turbine 1 by the following steps, wherein the UMC is applied by using a power reference as control handle:

A pitch rotation b of the wind turbine 1 and a roll rotation c of the wind turbine 1 are determined. A pitch difference d between the determined pitch rotation b and a wind turbine pitch reference f is calculated, and a roll difference g between the determined roll rotation c and a wind turbine roll reference h is calculated.

In a block 20, a pitch and roll impact value i is determined based on the pitch difference d and the roll difference g. The block 20 uses the Unified-Motion-Control (UMC) as it considers the combination of the pitch difference d and the roll difference g. In a block 21, a reference j of the parameter a is determined based on a predefined (for example power) reference k of the parameter a and the pitch and roll impact value i. The block 21 can be a controller that aims to coordinate/combine the nominal reference k of the parameter a and pitch and roll impact value i computed by the unified motion controller. The block 21 can be a controller that will ensure that these two signals are compatible in the sense that the reference j of the parameter a is the result of non-conflicting objectives and/or the highest priority is targeted. In the simplest case, it can be described as a reference summation.

Eventually, the parameter a of the wind turbine 1 is controlled based on the reference j of the parameter a. For example, the parameter a of the wind turbine can be controlled such that at least one of a speed, an acceleration and an amplitude of roll and pitch motions of the floating wind turbine 1 does not exceed a predetermined threshold value.

Blocks 23 and 24 designate a pitch event scheduler and a roll event scheduler, respectively. A scheduler can be described as a general block that determines the desired reference like a supervisory control layer. Some examples can be listed as follows:

event-triggered schedulers so that operational condition and states of the turbine (e.g. loads measurement/estimates) or wind/wave conditions can be used as inputs to determine the reference. A simple example can be a look-up table.

time-triggered schedulers so that a time instant can be a variable defining a different desired level of reference.

manual-triggered schedulers so that the values can be manually set.

In the embodiment of FIG. 1, the reference j of the parameter a is a target output power of the wind turbine 1. The output power of the wind turbine 1 is controlled based on the target output power for a speed regulation which minimizes blade pitch angle variations and/or aerodynamic damping variations. In addition or alternatively, the output power of the wind turbine 1 can be controlled based on the target output power for generating a counter torque to damp the wind turbine roll rotation.

In another embodiment, the reference j of the parameter a can be a target position of an add-on member on at least one of the blades 6, which add-on member changes an aerodynamic property of the blade 6. The position of add-on members on the blade 6 can be controlled based on the target position of add-on members on the blades 6 to implement a positive damping into the wind turbine 1 for cancelling a negative damping from a speed-pitch controller and thereby damping wind turbine pitch rotation. In addition or alternatively, the position of add-on members on the blade 6 can be controlled based on the target position of add-on members on the blades 6 individually for each blade 6 to implement a counter-torque for damping the wind turbine roll rotation.

In another embodiment, the reference j of the parameter a can be a target rotational speed of the hub 4 or a blade pitch angle of the blades 6.

The physical parameters can be measured or determined based on the following: the pitch rotation of the wind turbine 1 can determined based on a tower top acceleration which is measured by a G-sensor; the roll rotation of the wind turbine 1 can be determined based on the tower top acceleration which is measured by the G-sensor; the pitch rotation and/or the roll rotation can be determined from an acceleration in pitch and/or roll coordinates which are measured by a G-sensor; the pitch rotation and/or the roll rotation can be determined from a velocity in the pitch and/or roll coordinates which are measured by a gyroscope; the pitch rotation and/or the roll rotation can be determined from angles in the pitch and/or roll coordinates which are measured by an inclinometer; and/or the pitch rotation can be determined from a load on the blade 6 measured by a blade load sensor.

According to FIG. 3, the tower top acceleration is an acceleration at the top 12 of the tower 2. The tower top acceleration is induced by forces $F_{gx}$, $F_{gy}$, $F_{gz}$ which can be measured by the G-sensor. In FIG. 3, the pitch rotation and/or the roll rotation is designated by the term "offset" and can be determined by the inclinometer, the G-sensor or a gyroscope, for example from measured pitch and/or roll coordinates.

In an implementation, the pitch and roll impact value i can be determined from a lookup-table where values of the pitch difference d and the roll difference g are stored in advance as arguments. The pitch and roll impact value i can be considered as a control action which is determined by a control algorithm of the block 20. In the same manner, the reference j of the parameter a can be determined from a lookup-table where values of the predefined reference k and the pitch and roll impact value i are stored in advance as arguments. The pitch and roll impact value i and the reference j of the parameter can be determined by employing different control strategies such as classical ones like PI, PID, and/or advanced ones like MPC, sliding mode, state-feedback, LQR, etc.

Embodiments of the present invention can additionally include at least one of the following steps: estimating a natural frequency of the wind turbine roll rotation, for example of the roll rotation c, and/or the wind turbine pitch rotation, for example the pitch rotation b; a filtering step to provide a signal-to-noise ratio between a frequency of the wind turbine roll rotation, for example of the roll rotation c, and/or the wind turbine pitch rotation, for example the pitch rotation b, on the one hand, and a frequency of an input sensor signal on the other hand; a parametrical updating step to verify that the filtering step is targeting an expected frequency.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling an operation of a floating wind turbine, the floating wind turbine comprising a tower, a nacelle rotatably mounted to the tower about a nacelle yaw axis, a hub mounted to the nacelle rotatable about a hub rotational axis, and blades mounted to the hub, wherein the floating wind turbine is floated such that the wind turbine can perform a wind turbine yaw rotation about a wind turbine yaw axis parallel to the nacelle yaw axis, a wind turbine roll rotation about a wind turbine roll axis perpendicular to the wind turbine yaw axis and in parallel to the hub rotational axis, and a wind turbine pitch rotation about a wind turbine pitch axis perpendicular to the wind turbine roll axis and the wind turbine yaw axis; wherein
the method controls a parameter of the operation of the floating wind turbine by the following steps:
determining a pitch rotation of the wind turbine;
determining a roll rotation of the wind turbine;
calculating a pitch difference between the pitch rotation and a wind turbine pitch reference;
calculating a roll difference between the roll rotation and a wind turbine roll reference;
determining a pitch and roll impact value based on the pitch difference and the roll difference, wherein the pitch difference and roll difference remain as separate values through determination of the pitch and roll impact value;
determining a reference of the parameter based on a predefined reference of the parameter and the pitch and roll impact value; and
controlling the parameter of the wind turbine based on the reference of the parameter.

2. The method according to claim 1, wherein the reference of the parameter is a target output power of the wind turbine.

3. The method according to claim 2, wherein an output power of the wind turbine is controlled based on the target output power for a speed regulation which minimizes blade pitch angle variations and/or aerodynamic damping variations.

4. The method according to claim 2, wherein an output power of the wind turbine is controlled based on the target output power for generating a counter torque to damp the wind turbine roll rotation.

5. The method according to claim 1, wherein the reference of the parameter is a target position of an add-on member on at least one of the blades, which add-on member changes an aerodynamic property of the blade.

6. The method according to claim 5, wherein the position of the add-on member on the blade is controlled based on the target position of the add-on member on the blade to implement a positive damping into the wind turbine for cancelling a negative damping from a speed-pitch controller and thereby damping wind turbine pitch rotation.

7. The method according to claim 5, wherein the position of add-on members on the blades is controlled based on the target position of the add-on members on the blades individually for each blade to implement a counter-torque for damping wind turbine roll rotation.

8. The method according to claim 1, wherein the reference of the parameter is a target rotational speed of the hub or a blade pitch angle of the blades.

9. The method according to claim 1, wherein:
the pitch rotation of the wind turbine is determined based on a tower top acceleration at a top of the tower, which is measured by a G-sensor,
the roll rotation of the wind turbine is determined based on the tower top acceleration which is measured by the G-sensor,
the pitch rotation and/or the roll rotation is determined from an acceleration in pitch and/or roll coordinates which are measured by the G-sensor,
the pitch rotation and/or the roll rotation is determined from a velocity in the pitch and/or roll coordinates which are measured by a gyroscope,
the pitch rotation and/or the roll rotation is determined from angles in the pitch and/or roll coordinates which are measured by an inclinometer, and/or
the pitch rotation and/or the roll rotation is determined from a load on the blade measured by a blade load sensor which measures a load on at least one of the blades.

10. The method according to claim 1, wherein the method further includes at least one of the following steps:
estimating a natural frequency of the wind turbine roll rotation and/or the wind turbine pitch rotation; and
a filtering step to provide a signal-to-noise ratio between a frequency of a wind turbine roll rotation and/or a wind turbine pitch rotation on the one hand, and a frequency of an input sensor signal on the other hand, with a parametrical updating step to verify that the filtering step is targeting an expected frequency.

11. The method according to claim 1, wherein the pitch and roll impact value is determined from a lookup-table where values of the pitch difference and the roll difference are stored as arguments.

12. The method according to claim 1, wherein the reference of the parameter is determined from a lookup-table where values of the predefined reference and the pitch and roll impact value are stored as arguments.

13. The method according to claim 1, wherein the parameter of the wind turbine is controlled for controlling at least one of a speed, an acceleration, and an amplitude of roll and/or pitch motions of the floating wind turbine.

14. A control device for controlling an operation of a floating wind turbine, the floating wind turbine comprising a tower, a nacelle mounted to the tower rotatable about a nacelle yaw axis, a hub mounted to the nacelle rotatable about a hub rotational axis, and blades mounted to the hub, wherein the wind turbine is floated such that the wind turbine can perform a wind turbine yaw rotation about a wind turbine yaw axis in parallel to the nacelle yaw axis, a wind turbine roll rotation about a wind turbine roll axis perpendicular to the wind turbine yaw axis and in parallel to the hub rotational axis, and a wind turbine pitch rotation about a wind turbine pitch axis perpendicular to the wind turbine roll axis and the wind turbine yaw axis; wherein
the control device is configured to control a parameter of the operation of the floating wind turbine by:
determining a pitch rotation of the wind turbine;
determining a roll rotation of the wind turbine;
calculating a pitch difference between the pitch rotation and a wind turbine pitch reference;
calculating a roll difference between the roll rotation and a wind turbine roll reference;
determining a pitch and roll impact value based on the pitch difference and the roll difference, wherein the pitch difference and roll difference remain as separate values through determination of the pitch and roll impact value;
determining a reference of the parameter based on a predefined reference of the parameter and the pitch and roll impact value; and
controlling the parameter of the wind turbine based on the reference of the parameter.

15. The control device according to claim 14, wherein the reference of the parameter is a target output power of the wind turbine, and wherein the control device is configured:
to control an output power of the wind turbine based on the target output power for a speed regulation which minimizes blade pitch angle variations and/or aerodynamic damping variations, and/or
to control the output power of the wind turbine on the target output power for generating a counter torque to damp the wind turbine roll rotation.

16. The method according to claim 1, wherein the pitch and roll impact value is a control action which is determined by a control algorithm.

17. The method according to claim 1, wherein the determining the reference of the parameter based on the predefined reference of the parameter and the pitch and roll impact value is performed by a controller that combines the predefined reference of the parameter and the pitch and roll impact value computed by a unified motion controller, the controller ensuring that received signals are compatible such that the reference of the parameter is a result of non-conflicting objectives and/or a highest priority is targeted.

18. The method according to claim 1, further comprising:
determining the wind turbine pitch reference using a pitch event scheduler; and
determining the wind turbine roll reference using a roll event scheduler;
wherein the pitch event scheduler and/or the roll event scheduler comprise:
an event-triggered scheduler so that operational condition and states of the wind turbine or wind/wave conditions are used as inputs to determine the wind turbine pitch reference and/or the wind turbine roll reference;
a time-triggered scheduler so that a time instant is a variable defining a different desired level of reference; or
a manual-triggered scheduler so that wind turbine pitch reference values and/or wind turbine roll reference values are manually set.

19. The method according to claim 1, wherein the pitch and roll impact value is determined using a Unified-Motion-Control (UMC) that considers both the pitch difference and roll difference together.

\* \* \* \* \*